United States Patent [19]

Ohkawa et al.

[11] Patent Number: 4,734,246

[45] Date of Patent: Mar. 29, 1988

[54] ELONGATED TOROID FUSION DEVICE

[75] Inventors: Tihiro Ohkawa, La Jolla; Ming Chu, San Diego; Peter A. Politzer, Encinitas; Reagan W. Moore, San Diego, all of Calif.

[73] Assignee: GA Technologies Inc., San Diego, Calif.

[21] Appl. No.: 695,875

[22] Filed: Jan. 28, 1985

[51] Int. Cl.[4] .............................................. G21B 1/00
[52] U.S. Cl. ..................................................... 376/133
[58] Field of Search ........................ 376/121, 133, 150

[56] References Cited

U.S. PATENT DOCUMENTS

| 3,692,626 | 9/1972 | Ohkawa | 376/150 |
|---|---|---|---|
| 3,801,438 | 4/1974 | Ohkawa | 376/133 |
| 4,264,413 | 4/1981 | Ohkawa | 376/133 |

OTHER PUBLICATIONS

Becker et al., "Plasma Transport Comps. for High-B Plasmas with Impurities and Neutrals," IEAE 1977, pp. 763-773.
Becker, "Analytic Study of MHD-Equilibria of Plasmas with Non-Circular Cross-Sections," IEAE 1977, pp. 319-321.
Becker, "Free-Boundary Equilibrium Comps. for Strongly Elongated with Belt Pinch Plasmas," IEAE 1977, Vienna, pp. 903-908.
Wesley, "Fire Yrs. of Experiments with Non-Circular Plasmas in Doublet III", *Recent Results in Fusion Exp.*, pp. 181-186.
Becker et al., "Axisymmetric Instabilities of Non-Circular Plasma Cross-Sections and Computation of Highly Elongated Tokamak Equilibria," *Plasma Physics and Controlled Nuclear Fusion Research*, vol. II, 1976, pp. 401-409.
Becker Modelling of MHD Equilibria of the Garching Belt Pinches by a Cylindrical Slab," Plasma Physics and Controlled Nuclear Fusion Research, vol. II, 1976, pp. 9-13.
Becker et al., "Classical Transport in Belt-Pinch IIa, IEAE Vienna 1979, pp. 115-122.
Hofmann et al., "Belt Pinch Experiments", Ecole Polytechnique Federale de Lusanne, Switzerland, Conf-750905, 9/75, pp. 137-138.
Navratil, "Large Aspect Ratio, High-Beta Tokamak Fusion Reactor, DOE/ET/53016-57, 1985.
Hazeltine, R. D., et al., "Plasma Transport in a Torus of Arbitrary Aspect Ration," The Physics of Fluids, vol. 16, No. 10, Oct. 1973, pp. 1645-1653.
Becker, G., et al., "The Garching Belt-Pinch Experiments," 1974 Plasma Physics and Controlled Nuclear Fusion Research, vol. III, 1975, IAEA-CN-33/E 4-1, pp. 47-55.
Miller, R. L., and R. W. Moore, "Shape Optimization of Tokamak Plasmas to Localized Magnetohydrodynamic Modes," Physical Review Letters, vol. 43, No. 11, Sep. 10, 1979, pp. 765-768.
Bodin, H. A. B. and A. A. Newton, "Reversed-Field-Pinch Research," Nuclear Fusion, vol. 20, No. 10, 1980, pp. 1255-1329.
Pfeiffer, W. W., et al., "ONETWO: A Computer Code for Modeling Plasma Transport in Tokamaks," Prepared Under Contract DE-AT03-76ET51011, for the San Francisco Operations Office, DOE, General Atomic Project 3235, Dec. 1980, GA-A16178, UC-20.
Wagner, C. E., "Possibility of Achieving Ignition in a High-Field Ohmically Heated Tokamak," Physical Review Letters, vol. 46, No. 10, Mar. 9, 1981, pp. 654-657.
INTOR Group, "International Tokamak Reactor--Phase Two A., Part I," Nuclear Fusion, vol. 23, No. 11, 1983, pp. 1513-1537.
Young, K. M., et al., "TFTR Initial Operations," Plasma Physics and Controlled Fusion, vol. 26, No. 1A, 1984, pp. 11-22.

*Primary Examiner*—Deborah L. Kyle
*Assistant Examiner*—Richard L. Klein
*Attorney, Agent, or Firm*—Fitch, Even, Tabin & Flannery

[57] ABSTRACT

A toroidal fusion device with an elongated axial cross section is described which is capable of ignition without auxiliary heating and with modest toroidal magnetic field. The device is based on the principle that for elongated toroids the toroidal current density in the plasma at ignition is subject to a limit which is proportional to the product of the elongation and the toroidal magnetic field. The elongation is made greater than about 4. The aspect ratio is preferably between about 3 and 10.

7 Claims, 4 Drawing Figures

ELONGATED TOROID FUSION DEVICE

BACKGROUND OF THE INVENTION

This invention relates to an improved fusion device capable of heating a plasma to ignition with ohmic heating only and a relatively modest toroidal magnetic field. The great majority of existing and proposed toroidal fusion devices have an axial fusion chamber cross section (i.e., the cross section in a plane which includes the major axis) which is circular or essentially circular. (Examples are the Tokamak Fusion Test Reactor at Princeton University [*TFTR Initial Operations* by K. M. Young et al. in Plasma Physics and Controlled Fusion, Vol. 26, No. 1A, p. 11, 1984]; The JET Project, Scientific and Technical Developments 1977 and 1978 to 1 June, Report of the European Communities, EUR 6831 en, 1980; International Tokamak Reactor-Phase Two A, Part I [Executive Summary of the IAEA Workshop, 1981–1983] by the INTOR group, Nuclear Fusion, Vol. 23, p. 1513. 1984; Physical Review Letters, Vol. 46, p. 654, 1981 by C. E. Wagner; and Nuclear Fusion, Vol. 20, p. 1255, 1980 by H. A. B. Bodin and A. A. Newton.) A few toroidal fusion devices have been built with some deviation from a circular cross section. An example is the doublet design as set forth in Ohkawa, U.S. Pat. No. 3,692,626. For the doublet design the maximum vertical dimension of the plasma cross section is approximately 2.5 times the maximum horizontal dimension. (Also see *Five Years of Experiments with Non-Circular Plasma in Doublet III,* by J. C. Wesley, in ANS Transactions, American Nuclear Society Annual Meeting, New Orleans, June 1984, p. 185.) For devices with circular or essentially circular plasma cross sections ignition can be obtained only with very high toroidal magnetic field or with intensive auxiliary heating, both of which are extremely expensive.

A Belt Pinch device was constructed by the Max-Planck Institute für Plasmaphysik in the Federal Republic of Germany which had a plasma cross section with vertical dimension which range from 6 to 11 times the horizontal dimension. This device was heated by shock heating as opposed to ohmic heating which resulted in plasmas with high impurity levels. The highest current achieved was only about 2% of that needed for ignition. That project was abandoned in 1979.

SUMMARY OF THE INVENTION

An aspect of this invention is the provision of a fusion device with modest magnetic field with which ignition can be achieved with only ohmic heating. (With the exception of the shape of the plasma cross section and other changes necessitated or permitted by that change in shape, the device which is the subject of this invention is very similar to other toroidal fusion devices known in the art such as those referred to in the previous section.) Briefly, the objective of this invention is achieved by elongating the plasma cross section so that the vertical dimension of the plasma cross section is greater by a factor of about 4 or more than the horizontal dimension. This invention rests primarily on the principle that for elongated toroids the toroidal current density (i.e., the source of ohmic heating) in the plasma at ignition is subject to a limit which is proportional to $k\, B_T$ where $B_T$ is the toroidal magnetic field and $k$ is the elongation of the device. The elongation is essentially the ratio of the height of the plasma cross section to the thickness of the plasma cross section. By substantially increasing $k$ over fusion devices known to the prior art, the inventors have invented a fusion device capable of ignition with a modest $B_T$ and no auxiliary heating.

To further improve the stability and transport properties of the plasma, proper shaping of the configuration is desirable. Curving the plasma shape into a spherical or ellipsoidal shell can provide characteristics which improve both aspects of the device. These shapes naturally have a weak magnetic field at the center of the device and an increasing average magnetic field towards the surface, hence a deep averaged magnetic well. This deep averaged magnetic well allows the configuration to contain a larger amount of plasma stably for fusion reaction. The outboard parts of the flux surfaces which have positive curvature are shaped to have almost constant magnetic field strength, i.e., nearly omnigenous. Their characteristics minimize the effects of particles trapped magnetically. The kinetic stability and the transport properties of plasma are greatly improved. Further, these shapes also have a weaker variation of magnetic field on their surfaces, allowing the plasma to flow freely over the entire surface of each shape. This property is expected to improve the transport or confinement characteristics of the devices.

DESCRIPTION OF THE PREFERRED EMBODIMENTS

Figure 1:
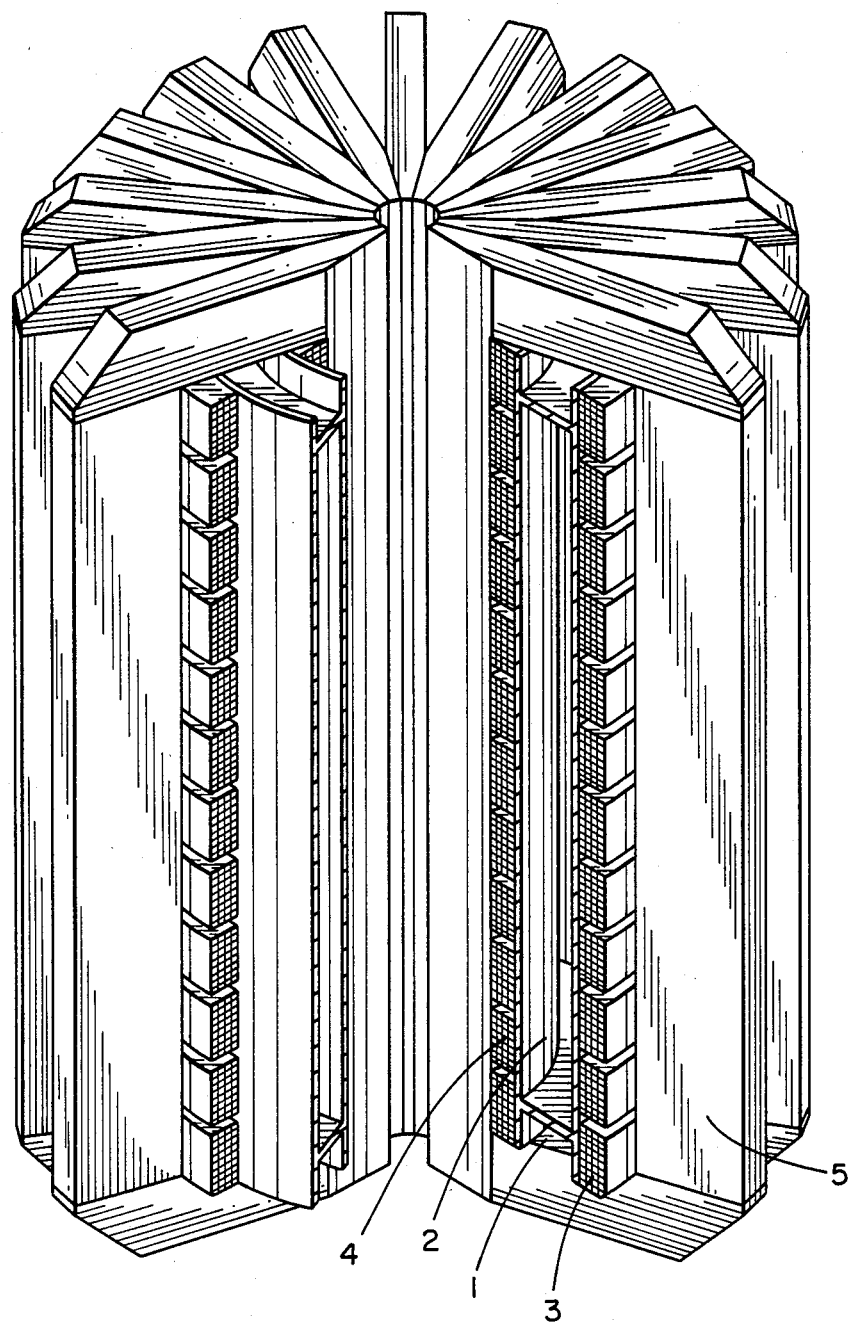
FIG. 1 is an isometric projection of one preferred embodiment of this invention with portions broken away.

Referring to FIG. 1, the plasma chamber 1 is a vacuum vessel that is a toroid generally in the shape of a hollow cylinder having an inside surface and an outside surface. The plasma 2 is contained inside the plasma chamber. Twelve horizontal magnetic coils 3 are aligned along the entire length of the outside surface of the hollow cylinder. Twelve similar coils 4 are aligned along the entire length of the inside surface of such hollow cylinder. Eighteen vertical magnetic coils 5, referred to herein as the toroidal coils, loop around the plasma chamber and the horizontal coils. The plasma chamber forms a vacuum boundary and a first wall of appropriate design, as is well known and contains appropriate gas, such as a mixture of deuterium and tritium, at a suitable low pressure. A toroidal liner (not shown) is made of thin wall material, such as stainless steel, which permits rapid penetration of toroidal electric field to start up and drive plasma current in the plasma chamber 1. The toroidal liner is disposed within and supported from a secondary confinement vessel in the form of a conductive shell not shown, which may be formed of a relatively thick copper wall. The space between the liner and shell is evacuated in a conventional manner not shown. The shell normally includes an insulating break (not shown) to interrupt the toroidal conductive path around the shell which would otherwise short circuit the toroidal conductive path through the plasma and inhibit the generation of plasma current.

The toroidal field coils and the horizontal coils may be substantially of conventional electrical and magnetic design for operating in the usual manner by way of producing plasma current and confining the resulting plasma. The plasma is generated and plasma current is caused to flow by operation of the horizontal coils, which are energized in a conventional manner by a power supply, not shown. The resulting plasma is then confined, shaped and positioned in the usual manner by the toroidal magnetic field produced by the toroidal coil 5 and the poloidal magnetic fields produced by the horizontal coils 3 and 4. Heat generated in the coils and in the fusion chamber is removed by known means not shown.

In this preferred embodiment, the four horizontal magnetic coils at the top and bottom of the device are designed for currents in the range of 0 to 4 megamps in the same direction as the plasma current and the other twenty horizontal coils are designed for currents in the range of 0 to 4 megamps in the direction opposite the direction of the plasma current. Each of the toroidal field coils is designed for currents of 0 to 5 megamps. The outside radius of the plasma chamber is 1.55 meters and the inside radius is 0.95 meters. The height of the chamber is 2.6 meters. The resulting plasma is toroidal, having a major axis defining an axial direction parallel thereto and a transaxial direction perpendicular thereto. The resulting plasma has a major radius inside the chamber of approximately 1.25 meters with a height, H, of 2.5 meters where the height H is the maximum dimension of the plasma. The thickness of the plasma is approximately 0.5 meters. Thickness is the maximum transaxial dimension of the plasma cross section. This gives an elongation, k, of approximately 5 for this preferred embodiment, where the elongation is the ratio of height to thickness, and an aspect ratio, A, of 5, where the aspect ratio is the ratio of the major radius to half the thickness.

Relationship of $B_T$, k and A for Ignition

Close to ignition, the power input and loss processes consist of ohmic input $P_\Omega$, fusion power input $P_f$, (bremsstrahlung) radiation loss $P_b$, and electron and ion transport losses $P_e$ and $P_i$. Thus the net local power input is given by $$P = \frac{\partial 3nT \times 1.6 \times 10^{-16}}{\partial t} = P_\Omega + P_f - P_b - P_e - P_i, \quad (1)$$

where n is the plasma density.

The local temperature T will increase or decrease depending on whether $P>0$ or $P<0$. In (1), we assume electrons and ions are equilibrated to the same local temperature. MKS units are used throughout and the temperature is measured in keV. In the temperature range of interest the ohmic power input is given by $C_j T^{-3/2}$, where $C_j$ is given by $1.65 \times 10^{-9} Z_{eff} L_n F_{tr} j^2$, where $Z_{eff}$ is the effective ion charge number, $L_n$ is the plasma Coulomb logarithm, $F_{tr}$ is the neoclassical trapped particle resistivity enhancement factor, and j is the local current density. The fusion power may be approximated by $C_f n^2 T^3$, with $C_f$ being $1.53 \times 10^{-38} \alpha$, where $\alpha$ stands for the fraction of $\alpha$-particle energy absorbed by the plasma. The bremsstrahlung power loss is given approximately by $C_b n^2 T^{\frac{1}{2}}$, with $C_b$ having the value of $5.34 \times 10^{-37} Z_{eff}$. The ion energy and electron energy loss processes are not strictly a local process and depend also on the average gradients of the density and temperatures. For classical or neoclassical ion confinement, however, the ion energy loss rate is proportional to $n^2 T^{\frac{1}{2}}$. In the empirical Pfeiffer-Waltz scaling law for ohmically heated plasma, the electron energy loss rate is proportional to T.

To facilitate a scoping investigation over different sized devices, we average the relation (1) over a given plasma profile. The average power input is given by $$\bar{P} = \bar{C}_j \bar{T}^{-3/2} + \bar{C}_f \bar{n}^2 \bar{T}^3 - (\bar{C}_b + \bar{C}_i)\bar{n}^2 \bar{T}^{\frac{1}{2}} - \bar{C}_e \bar{T}. \quad (2)$$

In (2), a bar over the quantity denotes the average over the plasma volume. Assuming fixed parabolic profiles of density, temperature and current, we obtain the expressions shown in Table 1.

TABLE 1
EXPRESSIONS FOR THE $\bar{C}$ COEFFICIENTS

| | |
|---|---|
| $\bar{C}_f = K_f a$ | $K_f = 1.53 \times 10^{-38} \dfrac{(p_n + 1)^2 (p_T + 1)^3}{(2p_n + 3p_t + 1)}$ |
| $\bar{C}_b = K_b Z_{eff}$ | $K_b = 5.34 \times 10^{-37} \dfrac{(p_n + 1)^2 (p_T + 1)^{1/2}}{(2p_n + p_t/2 + 1)}$ |
| $\bar{C}_i = K_i \dfrac{\mu^{1/2} Z_{eff}}{a^2 A^{1/2} B_p^2} \left(1 + \dfrac{3}{2} \dfrac{\kappa^2}{A^{3/2} q^2 K}\right)$ | $K_i = 1.715 \times 10^{-37} \dfrac{(p_n + 1)(p_T + 1)}{(p_n + p_T + 1)}$ |
| $\bar{C}_e = K_e \dfrac{1}{a^{13/4} A^2 K}$ | $K_e = 1.02 \times 10^5 \dfrac{(p_n + )(p_T + 1)}{(p_n + p_T + 1)}$ |
| $\bar{C}_j = K_j Z_{eff} \dfrac{\tilde{B}_p^2}{a^2 K^2} F_{tr}$ | $K_j = 4.179 \times 10^3 \dfrac{(p_j + 1)^2 L_n}{(2p_j - 3p_T/2 + 1)(p_T + 1)^{3/2}}$ |

In here, the density (temperature, current density) profile has been taken to be of the form $[1 - (x^2/a^2) - (y^2/k^2 a^2)]^{P_n(P_T, P_j)}$. a is the half thickness of the plasma, $P_n$, $P_T$, $P_j$ are the exponents of the profiles and A is the ratio of the major radius to the half width of the plasma. The ion channel loss has been assumed as $(3/2)\bar{n}\bar{T} \times 10^{-16} \times 1.6/\tau_{Ei}$. We have included the ion loss due to both the neoclassical banana heat transport and the classical ion heat transport. The neoclassical ion confinement time is given by $$\tau_{Ei(neoclassical)} = 1.4 \times 10^{21} \bar{n}^{-1} \bar{T} - \frac{1}{4} a^2 A^{-3/2} \bar{q}^2 B^2 \mu^{-\frac{1}{2}} Z^{-1}_{eff} k^2. \quad (3)$$

The ratio of the classical to neoclassical heat loss was taken as $(3/2)[k^2/(a^{3/2}q^2K)]$. The electron energy confinement time is given by $$\tau_{Ee} = 2.35 \times 10^{-21} \bar{n} a^{5/4} R^2 K. \quad (4)$$

K is the correction factor due to noncircularity and is given by $2k^2/(1+k^2)$. $\mu$ is the ion mass number and $\bar{B}_p$ stands for $kB_T/qA$. q is the safety factor. We note that written in the present form, attributes of the device, such as aspect ratio, minor radius, and elongations are implicitly defined through $\bar{C}$ coefficients.

Strictly speaking, ignition could be defined as the plasma condition at which (1) is positive for every point within the plasma and for all T. The problem would then become very complicated and cumbersome. We therefore adopt the milder condition and define ignition as the condition at which $\bar{P} \geq 0$ as defined by (2) is true for all $\bar{T}$, at a fixed $\bar{n}$.

The average ignition condition given by $\bar{P} \geq 0$ in Eq. (2) is readily solved analytically. We note that at a fixed $\bar{n}$, at low $\bar{T}$, the power is dominated by the ohmic input and could always be made positive with low enough $\bar{T}$. As the temperature is raised, ohmic power is reduced, as is the total power $\bar{P}$. But at sufficiently high temperature, the fusion power input will be the dominant contribution in (2), the total power $\bar{P}$ will be positive again. Conversely, at a given $\bar{T}$ higher than the ignition temperature, there is a range of densities between $\bar{n}_1$ and $\bar{n}_2$ over which the plasma will make a thermal excursion from the low temperature ohmic regime to the high temperature fusion dominated regime.

The density range $(\bar{n}_1, \bar{n}_2)$ is obtained by solving simultaneously $$\bar{P} = 0, \quad (5)$$

and $$\frac{\partial \bar{P}}{\partial \bar{T}} = -\frac{3}{2} \bar{C}_j \bar{T}^{-5/2} + 3\bar{C}_f \bar{n}^2 \bar{T}^2 - \frac{1}{2}(\bar{C}_b + \bar{C}_i)\bar{n}^2 \bar{T}^{-\frac{1}{2}} - \bar{C}_e = 0. \quad (6)$$

$\bar{n}^2$ may be eliminated to give $$a\bar{T}^5 + b\bar{T}^{5/2} + c = 0, \quad (7)$$

where $$a = 2\bar{C}_e \bar{C}_f > 0, \quad (8)$$

$$b = \frac{1}{2} \bar{C}_e(\bar{C}_b + \bar{C}_i) - \frac{9}{2} \bar{C}_j \bar{C}_f, \quad (9)$$

$$c = 2\bar{C}_j(\bar{C}_b + \bar{C}_i) > 0. \quad (10)$$

We thus obtain the two corresponding temperatures $$\bar{T}_{1,2} = \frac{-b \pm \sqrt{b^2 - 4ac}}{2a}. \quad (11)$$

The solutions are physically meaningful when $$b < 0, \quad (12)$$

and $$b^2 \geq 4ac. \quad (13)$$

The explicit expressions for the densities $(\bar{n}_1, \bar{n}_2)$ are found by back substitution of (11) into (5) or (6).

The range of densities $(\bar{n}_1, \bar{n}_2)$ is decreased by reducing those parameters of the device which enhance plasma ignition, specifically, by reducing $b^2 - 4ac$. Thus, the minimal condition for ignition is $$b^2 - 4ac = (\tfrac{1}{4})\{[\bar{C}_e(\bar{C}_b + \bar{C}_i) - 81\bar{C}_j\bar{C}_f][\bar{C}_e(\bar{C}_b + \bar{C}_i) - \bar{C}_j\bar{C}_f]\} = 0. \quad (14)$$

In view of (12), (14) gives $$\bar{C}_j \bar{C}_f = \bar{C}_e(\bar{C}_b + \bar{C}_i). \quad (15)$$

Then the ignition plasma temperature and density satisfying the minimal ignition condition are $$\bar{T}_m = \left( \frac{\bar{C}_b + \bar{C}_i}{\bar{C}_f} \right)^{2/5}, \quad (16)$$

and $$\bar{n}_m = \frac{\bar{C}_e^{1/2}}{(\bar{C}_b + \bar{C}_i)^{2/5} \bar{C}_f^{1/10}}. \quad (17)$$

At this ignition point, the invidual powers in the expression for $\bar{P}$ satisfy $$\bar{P}_\Omega = \bar{P}_e = \bar{P}_f = \bar{P}_i + \bar{P}_b. \quad (18)$$

The present solution is obtained independent of the possible uncertainties in the various coefficients in the power input and loss so long as the $\bar{n}$ and $\bar{T}$ functional dependencies are the same.

Condition (15) gives a quadratic expression in $B_T$, which may be solved to give the necessary toroidal field for ignition as $$B_T = \frac{qA\bar{B}_p}{\kappa} = \left[ \tilde{s} + \sqrt{\tilde{s}^2 + 4\tilde{t}} \right]^{1/2} \frac{1}{\sqrt{F_{tr}}}, \quad (19)$$

where $$\tilde{s} = \frac{K_e K_b}{K_j K_f} K, \quad (20)$$

$$\tilde{t} = \tilde{s} \frac{K_i \mu^{1/2} A^{3/2} a}{K_b a^{3/4}} F_{tr}. \quad (21)$$

It is seen that as elongation increases, the required toroidal field decreases with elongation as $1/k$. The factor $\tilde{t}$ is due to the ion transport loss, which is becoming less important at large elongations.

The required total current $I_p$ is then given through the current density j $$j = \frac{2B_T}{\mu_0 R} \frac{(1 + k^2)}{2k} \frac{1}{q}, \quad (22)$$

-continued $$I_p = j\pi ab = \pi a \frac{B_T}{\mu_o A} \frac{1}{q} (1 + k^2), \quad (23)$$

and is thus proportional to k for large k.

The Troyon limit for MHD stability in this case is given by $$\beta_{TI} = \frac{0.075}{A} \frac{(1 + k^2)}{q}. \quad (24)$$

The beta value is given by $$\beta = \frac{\overline{(3nT)_m}}{B_t^2/2\mu_0} \quad (25)$$

$$= \frac{12\mu_0 F_{tr} \kappa^2 a^{1/2}}{a^{3/8} A K^{3/2} q^2} \left[\frac{K_j K_i^{1/2}}{K_b K_e^{1/2}}\right] \frac{1.6 \times 10^{-16}}{\left[1 + \sqrt{1 + 4\tilde{t}/\tilde{s}^2}\right]} \frac{(p_n + 1)(p_T + 1)}{(p_n + p_T + 1)}. \quad (25)$$

We require $\beta < \beta_{TI}$, which may be viewed as a requirement on the minimum plasma half-thickness a. Numerical examples of equilibria have been found which are stable at an elongation of 5 at the value of beta required for ignition which for the preferred embodiment is about 7%.

We note that we have obtained thus far a complete solution for the ignition condition. Since the explicit expressions for all the relevant quantities are given, ignition condition variation due to changes in the various parameters such as radius, aspect ratio, $Z_{eff}$, etc. can be easily examined. Of particular interest is the possibility of readily examining the consequences of a change in the ignition margin M. We may accomplish this by multiplying all the power loss $P_i$, $P_e$, $P_b$ by the factor M.

By examination of the terms in the expression for the volume averaged net power in the plasma, and fixing the profiles, we see that $\overline{P}$ is a function of the ten independent variables, $\bar{n}$, $\bar{T}$, $Z_{eff}$, $\bar{B}_p$, $F_{tr}$, $\alpha$, $\mu$, a, A, and k. The ignition constraints plus minimizing current at ignition reduce the number of independent variables to seven. By further assuming a given value q for the safety factor, we obtain the required toroidal magnetic field as a function of the six independent variables k, a, A, $\alpha$, $\mu$, and $F_{tr}$. The density and temperature are given in terms of $B_t$, the above six variables and $Z_{eff}$.

We regard k, a, and A as the independent variables of primary interest and simply fix $\alpha = 1.0$, $\mu = 2.5$, and $Z_{eff} = 1.0$. The density and temperature profiles are chosen to be parabolic ($p_n = P_t = 1$) and the current density is proportional to Spitzer conductivity ($p_j = (3/2)$). A banana regime expression can be used for $F_{tr}$ relating it primarily to the aspect ratio A, $$\frac{\eta_\parallel}{\eta_{sp}} = \left[1 - \frac{1.95(r/R_0)^{1/2} - 0.95(r/R_0)}{1 + \nu_{*e}}\right]^{-1}, \quad (26)$$

as adapted from Hazeltine, Hinton, and Rosenbluth (Phys. Fluids 16, 1973, p. 1645). We use the transport code of Pfeiffer et al. (Pfeiffer, Davidson, Miller and Waltz, *A Computer Code for Modelling Transport in Tokamaks*, GA Technologies Report GAA16178, 1980) to carry out the profile integration required for $F_{tr}$. We find $F_{tr} = 2.0$, 1.6, and 1.4 for A = 3, 5, and 7, respectively.

Figure 2:
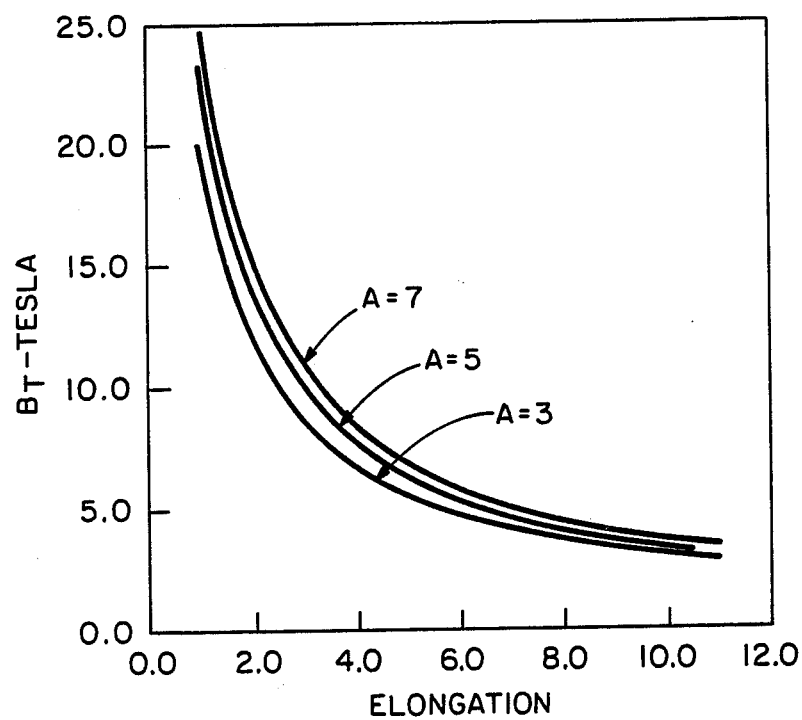
FIG. 2 is a chart showing the relationship at ignition between the elongation of a magnetic fusion device, the aspect ratio and the toroidal field.

Choosing a representative value of the half thickness a = 0.25 m, FIG. 2 shows toroidal magnetic field, $B_T$, as a function of elongation k, with aspect ratios A as a parameter. The required toroidal field has only a weak dependence on aspect ratio, through the small ion transport term $\bar{t}$ in (19). For k = 1, the large values of B ($\approx 20$ tesla) are obtained. At large values of k, the required $B_T$ decreases inversely proportional to k, achieving readily feasible engineering values. For example, at k = 5, toroidal fields $\approx 6$ T are required. This is the most significant improvement in magnetic fusion design features as a result of elongation.

Using FIG. 2, ignition can be achieved in this preferred embodiment with a toroidal field of approximately 6.5 tesla. This compares with a toroidal field of approximately 20 tesla which would be required to achieve ignition in a torus of approximately the same size of this embodiment.

Figure 3:
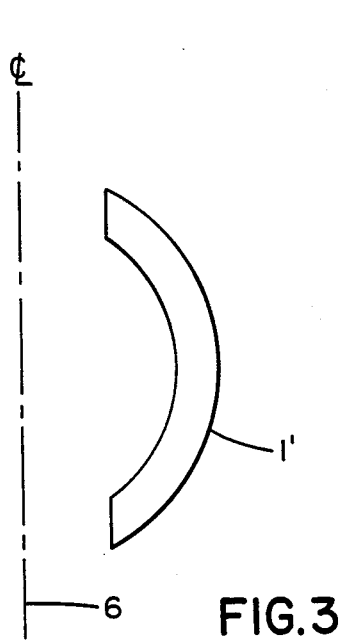
FIG. 3 is the plasma chamber cross section of another form of the invention having the general shape of a spherical shell.
Figure 4:
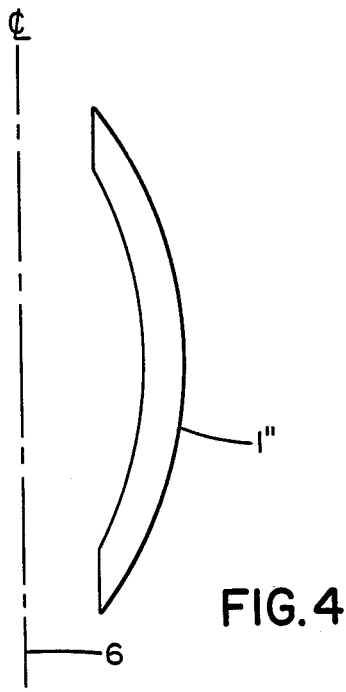
FIG. 4 is the plasma chamber cross section having the general shape of an ellipsoidal shell.

As various changes could be made in the above construction without departing from the scope of the invention, it is intended that all matter contained in the above description or shown in the accompanying drawings shall be interpreted as illustrative and not in a limiting sense. For example, the plasma chamber instead of being in the form of a hollow cylinder could be in the general form of a spherical shell 1' or an ellipsoidal shell 1" as indicated in FIGS. 3 and 4, respectively, relative to its major axis 6.

These shapes naturally have a deeper averaged magnetic well, and the outboard side of the flux surfaces are nearly omnigeneous, i.e., the magnetic field strength is constant. It is thus expected that the B limit and the transported properties can be improved over that in FIG. 2. Other variations are also possible, for example, the safety factor, q, could be less than 1 (for which pinch devices are an example) or q could be greater than 1 (for which tokamaks are an example). The fuel used in lieu of deuterium-tritium could be deuterium only or other advanced fuels. Also, although the coils in FIG. 1 are referred to as being horizontal and vertical the device can be placed in any convenient disposition.

What is claimed is:

1. A device for achieving ignition of a plasma with ohmic heating comprising:
    means for defining a toroidal plasma chamber, and confining gas therein, and
    means including electrically conductive coils for generating plasma within said chamber and for confining and shaping such plasma substantially into and filling a predetermined single region of said chamber without an axisymmetric internal separatrix and ohmically heating the confined plasma to ignition, said predetermined region being toroidal with a major axis defining an axial direction parallel thereto and a transaxial direction perpendicular to said axis and having an axial cross section with an elongation, k, greater than 4, where k is the ratio of the maximum axial dimension of said cross section to the maximum transaxial dimension of said cross section.

2. The device as set forth in claim 1 wherein said device has an aspect ratio A greater than of 2 and less than 20 where the aspect ratio is defined as the major radius of said region divided by half the maximum transaxial dimension of said cross section.

3. The device as set forth in claim 2 wherein the toroidal chamber is defined by a vessel generally in the shape of a hollow cylinder.

4. The device as set forth in claim 2 wherein the toroidal chamber is defined by a vessel generally in the shape of a spherical shell.

5. The device as set forth in claim 2 wherein the outer surface of said toroidal chamber is defined by a vessel generally in the shape of an ellipsoidal shell.

6. A device according to claim 1 wherein said means for generating and confining said plasma comprises a tokamak having a safety factor q greater than 1.

7. A device according to claim 2 wherein said means for generating and confining said plasma comprises a tokamak having a safety factor q greater than 1.

* * * * *

UNITED STATES PATENT AND TRADEMARK OFFICE
CERTIFICATE OF CORRECTION

PATENT NO. : 4,734,246

DATED : March 29, 1988

INVENTOR(S) : T. Ohkawa, et al.

It is certified that error appears in the above-identified patent and that said Letters Patent is hereby corrected as shown below:

On Abstract page, under "OTHER PUBLICATIONS", in the Wesley reference, change "Fire" to --Five--.

In the Becker reference "Modeling", after "Becker" insert a comma and quotation marks.

In the Becker et al. reference "Classical Transport", after "IIa," insert quotation marks.

In the Navratil reference, after "Reactor," insert quotation marks and change "53016-57" to --53016-87--.

Column 1, line 41, change "range" to --ranged--.

Column 2, line 67, change "inerupt" to --interrupt--.

Column 4, line 33, after "$\bar{P}$" in Equation (2) change "-" to --=--;

Table I, change "$K_f a$" to --$K_f \alpha$--, "$a^2$", both occurrences, to --$a^2$-- and "$a^{13/4}$" to --$a^{13/4}$--;

line 61, change "$k^2$" to --$\kappa^2$--;

line 61, change "Pn(PT, Pj)" to --$p_n(p_T, p_j)$--;

line 62, change "Pn, PT, Pj" to --$p_n$, $p_T$, $p_j$--.

Column 5, line 2, equation (3) change "$k^2$" to --$\kappa^2$--;

line 6, change "$k^2$" to --$\kappa^2$--;

UNITED STATES PATENT AND TRADEMARK OFFICE
CERTIFICATE OF CORRECTION

PATENT NO. : 4,734,246

DATED : March 29, 1988

INVENTOR(S) : T. Ohkawa, et al.

It is certified that error appears in the above-identified patent and that said Letters Patent is hereby corrected as shown below:

line 12, change "$2k^2/(1 + k^2)$" to $--2\kappa^2/(1 + \kappa^2)--$;

line 13, change "k" to $--\kappa--$;

line 21, change "therfore" to --therefore--;

line 45, change "$\frac{\partial \bar{P}}{\partial T}$" to $--\frac{\partial \bar{P}}{\partial \bar{T}}--$.

Column 6, lines 13 and 14, Equation (14), change "$\bar{C}_e(\bar{C}_e(\bar{C}_b+\bar{C}_i)$" to $--\bar{C}_e(\bar{C}_b+\bar{C}_i)--$;

line 34, change "invidual" to --individual--;

line 56, in the numerator of equation (21) change "$a$" to $--\alpha--$;

line 65, equation (22) change "$\frac{1 + k^2}{2k}$" to $--\frac{1 + \kappa^2}{2\kappa}--$.

Column 7, line 1, change "-continued" to --by--;

line 3, equation (23), change "$k^2$" to $--\kappa^2--$;

line 6, change "k" both occurrences, to $--\kappa--$;

line 21, Equation (25) change "$a^{1/2}$" to $--\alpha^{1/2}--$;

line 42, change "$a$" to $--\alpha--$;

UNITED STATES PATENT AND TRADEMARK OFFICE
CERTIFICATE OF CORRECTION

PATENT NO. : 4,734,246

DATED : March 29, 1988

INVENTOR(S) : T. Ohkawa, et al.

It is certified that error appears in the above-identified patent and that said Letters Patent is hereby corrected as shown below:

line 42, change "a" to --$\alpha$--;

line 42, change "k" to --$\kappa$--;

line 47, change "k, a," to --$\kappa, \alpha,$--;

line 48, change "$\alpha$" to --$\alpha$--;

line 50, change "k, a," to --$\kappa, \alpha,$--;

line 51, change "$\alpha$" to --$\alpha$--;

line 53, change "P$_t$" to --p$_t$--.

Column 8, line 4, change "a" to --$\alpha$--;

lines 5, 8, 9, 10 and 11, change "k" to --$\kappa$--;

line 12, change "≈" to --~--.

line 44, change "omnigeneous" to --omnigenous--.

Column 9, line 7, delete "of".

Signed and Sealed this

Second Day of January, 1990

Attest:

JEFFREY M. SAMUELS

Attesting Officer     Acting Commissioner of Patents and Trademarks